June 25, 1968
C. E. RASMUSSEN
3,389,542
STRAWBERRY HARVESTER
Filed Aug. 3, 1965
3 Sheets-Sheet 1
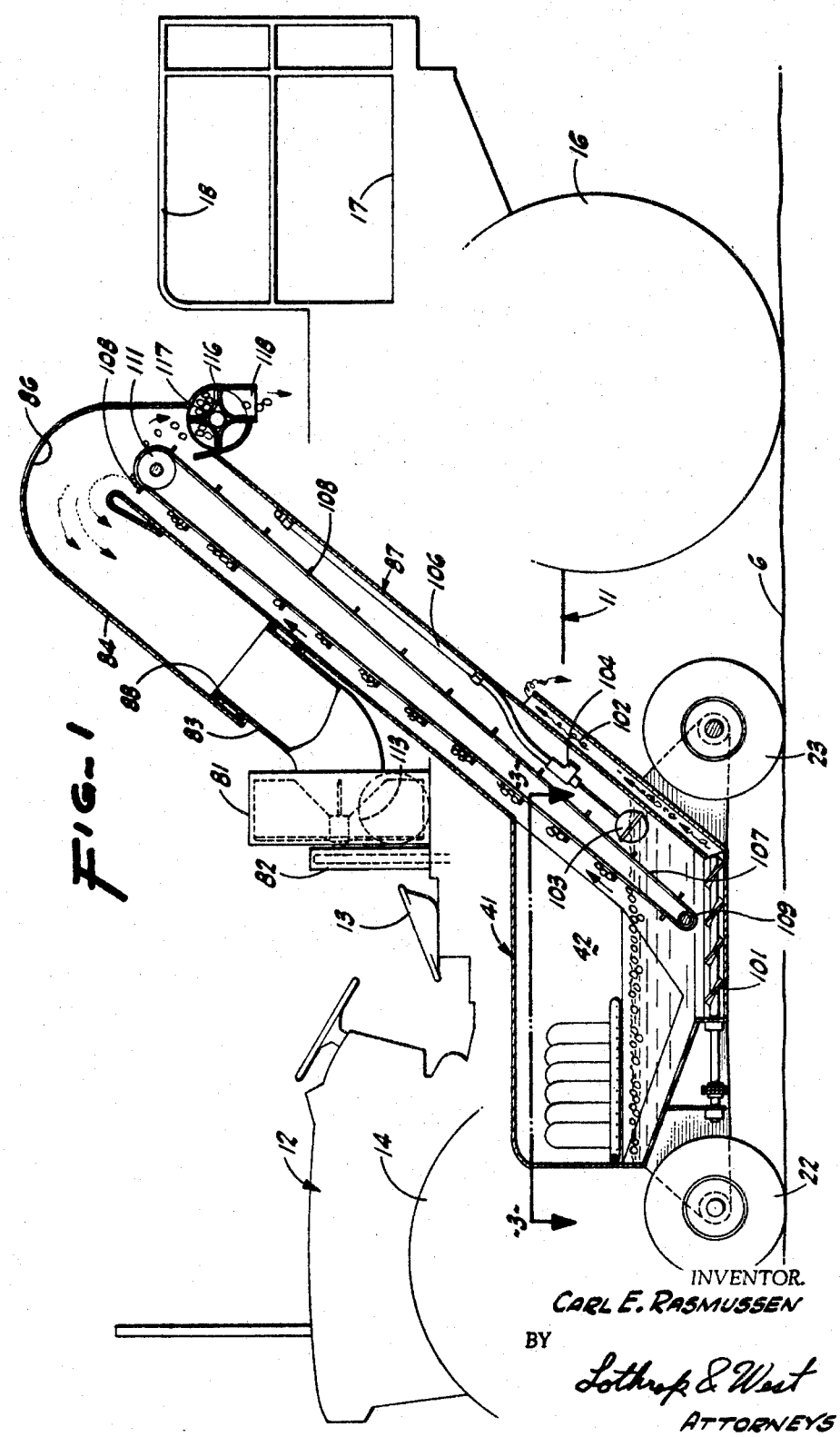
INVENTOR.
CARL E. RASMUSSEN
BY
Lothrop & West
ATTORNEYS June 25, 1968  C. E. RASMUSSEN  3,389,542
STRAWBERRY HARVESTER
Filed Aug. 3, 1965  3 Sheets-Sheet 2
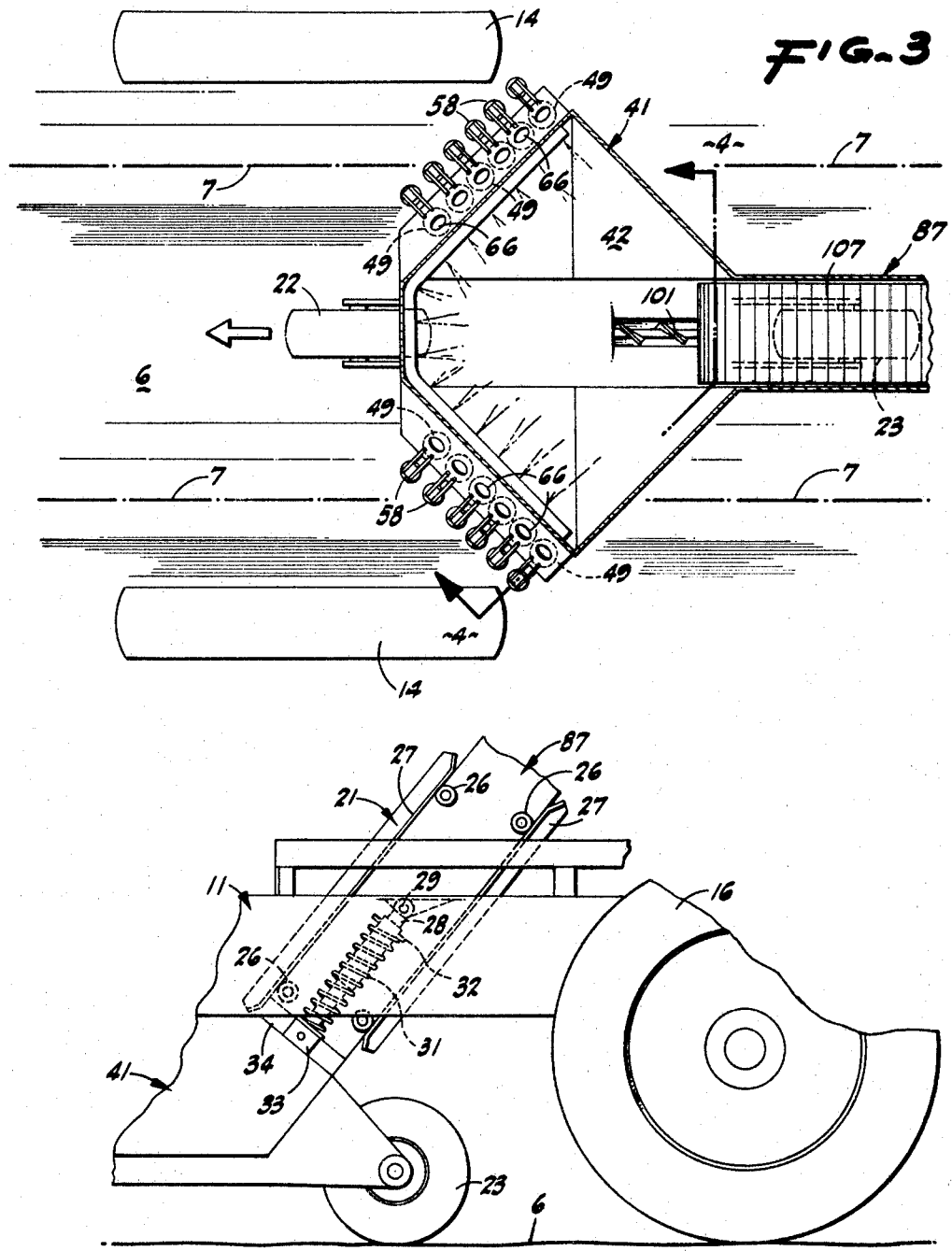
INVENTOR.
CARL E. RASMUSSEN
BY
Lothrop & West
ATTORNEYS

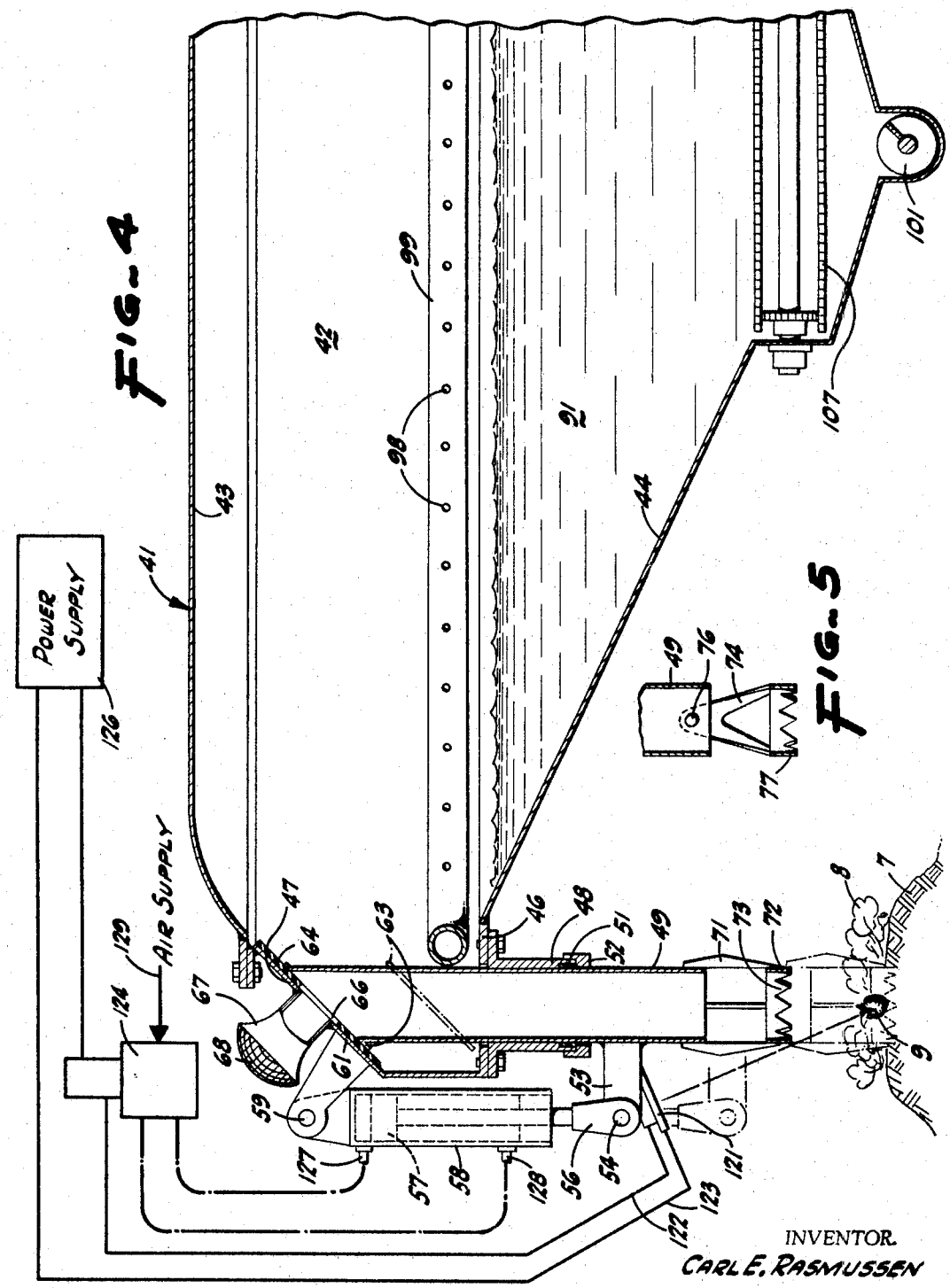

United States Patent Office 3,389,542
Patented June 25, 1968

3,389,542
STRAWBERRY HARVESTER
Carl E. Rasmussen, 2175 5th St.,
Atwater, Calif. 95301
Filed Aug. 3, 1965, Ser. No. 476,799
14 Claims. (Cl. 56—331)

My invention is generally concerned with machines for use in gathering strawberries from strawberry plants growing in rows in a field.

At the present time, strawberries are hand gathered by stoop labor from strawberry plants which are usually grown in linear rows spaced apart appropriate distances in a relatively level field. The availability of such labor is becoming more and more questionable, and the cost of such labor is getting higher and higher, so that there is an increasingly pressing demand for a machine which will remove strawberries from the plants in the field and preferably do so in a way that is compatible with present culture conditions.

It is therefore an object of the invention to provide a mechanism which can be advanced in a field to remove strawberries from strawberry plants in the field.

Another object of the invention is to provide a strawberry harvester in which the berries are gently handled from the time they are removed from the plant until they are discharged from the machine.

Another object of the invention is to provide a strawberry harvester effective to provide selective harvesting; that is, a harvester which will harvest those strawberries of an appropriate ripe color and will not harvest strawberries of an unripe green color.

Another object of the invention is to provide a strawberry harvester that can effectively canvass a strawberry growing field for retrieval of the berries which are at that time appropriate for harvesting.

Another object of the invention is to provide a generally improved strawberry harvester.

Other objects together with the foregoing are attained in the embodiment of the invention described in the accompanying description and illustrated in the accompanying drawings, in which:

FIGURE 1 is an part diagrammatic and is in part a cross section on a vertical longitudinal plane through a strawberry harvester constructed in accordance with the invention;

FIGURE 2 is a fragmentary view showing a portion of the carriage structure of the device shown in FIGURE 1, parts of the figure being broken away to reduce its size;

FIGURE 3 is a cross section, the plane of which is indicated by the line 3—3 of FIGURE 1;

FIGURE 4 is a cross section to an enlarged scale, the planes of section being indicated by the lines 4—4 of FIGURE 3; and FIGURE 5 is a detail of the lower end of a tube mechanism with a modified form of cutter thereon.

In its ordinary environment of use, the strawberry harvester is employed in a field 6 generally approximately level in which there are disposed at spaced intervals a number of rows 7 (FIGURE 4) of strawberry plants 8 having numerous strawberries 9 growing thereon, all or only some of which are available for optimum harvesting.

The harvester itself includes a main frame 11. This can readily be part of a motorized tractor vehicle 12 having an operator's station 13, front ground-engaging wheels 14 and rear ground-engaging wheels 16. The wheels are usually four in number, and it is customary to power drive all of them. The vehicle 12 is also inclusive of an attendant's platform 17 enclosed by a railing 18 for safe operation. The purpose of the vehicle 12 is to advance under power within the field 6 along the rows 7 and not only to advance itself, but also to afford power for auxiliary structures concerned with the strawberry harvest.

Appropriately located and disposed largely beneath the vehicle is a subframe 21 made up of a number of structural shapes, angles and plates and provided with a forward wheel 22 engaging the ground and a rearward wheel 23 engaging the ground. In many respects the subframe 21 can be separately considered as a carriage. The carriage or subframe 21 and the main frame 11 or vehicle 12 are interrelated for simultaneous advancement in the field and so that the subframe or carriage can rise or fall to accommodate itself to minor irregularities in the terrain.

For that reason, the subframe 21 carries a plurality of rollers 26 (FIGURE 2) designed to run on and against linear rails 27 secured on the main frame 11 at a slant. Also secured to the main frame are spring guides 28 held in position by pin joints 29 and guiding helical tension springs 31. The springs are arranged to fasten to collars 32 fixed on the guides 28 and also to fasten to spring pads 33 arranged on cross members 34 forming part of the subframe 21. With this arrangement, the subframe or carriage 21 is relatively free to move with a vertical component in a diagonal path, but bears lightly on the usually soft ground since its weight is reduced by the lifting force of the springs 31. In this fashion, the carriage is free to follow the ground contour, but is nevertheless constrained to advance generally with the main frame 11 of the vehicle 12.

Arranged on the carriage 21, preferably in the forward portion thereof, and having a sufficient width, usually, to straddle at least a pair of rows 7 of strawberry plants 8, is an enclosure 41 defining an interior compartment 42 in part bounded by an upper wall 43, inclined lower walls 44, bottom walls 46 and angular walls 47.

Arranged along the bottom wall 46 in laterally overlapping or staggered array are sleeves 48 serving as mountings and guides for telescopic tubes 49 vertically slidable therein. Since all of the sleeves and tubes are substantially the same, a description of one applies equally to the others. Each of the tubes 49 is generally circular cylindrical in configuration and is arranged to slide easily within the sleeve 48 and also through a packing gland 51 adjusted by a packing nut 52 at the lower end of the sleeve. Despite the relative sliding motion, there is no air leakage through the sleeve 48.

The tube 49 at a convenient location is provided with an arm 53 joined by a pin 54 to the piston rod 56 of a piston 57. This is reciprocable vertically within a cylinder 58 joined by a pin 59 to a bracket 61 on the outside of the wall 47. When the piston 57 is impelled upwardly and downwardly, the tube 49 is similarly impelled therewith to travel between an uppermost position and a lowermost position. In the uppermost position, a bevelled or slanted upper end of the tube 49 lodges with an outstanding, angled flange 63 against a sealing pad 64 of relatively resilient material. This is positioned against the inside of the wall 47 and surrounds an opening 66 leading through a breather tube 67 and a screen 68 to the atmosphere.

In the uppermost position of the tube, while the atmosphere can flow freely to the inside of the tube, communication between the atmosphere and the interior of the chamber 42 is blocked. However, when the piston 57 moves downwardly and the tube 49 likewise moves downwardly, as soon as the flange 63 leaves the sealing pad 64, communication is established through the tube 67 between the atmosphere and the interior of the compartment 42.

When the piston 57 descends toward its lowermost position and the tube 49 descends therewith, the lower end of the tube is moved closer to a strawberry plant 8 on the row 7. Since it is desired to utilize this lowering motion of the tube at intervals carries spaced apart struts 71 posistrawberry available for picking, the lower end of the tube itself may be sharpened, but preferably carries a special cutter. As shown particularly in FIGURE 4, the lower end of the tube at intervals carries spaced apart struts 71 positioning a ring 72 at a predetermined distance from the lower end of the tube 49. The ring has sharp serrations 73 on its lower margin. When the tube 49 descends, the sharp serrated portions 73 pass through the strawberry plant around a strawberry 9 thereon and even enter into the mounded earth of the row 7. Since preferably the stroke of the piston 57 is limited, the amount that the ring or cutter 72 enters the ground is also limited.

As an alternative construction, as shown in FIGURE 5, the lower end of the tube 49 instead of being provided with relatively rigid stuts 71 can carry a pair of oppositely disposed A-frames 74 mounted to pivot about transversely extending axles 76 extending from the tube 49. The A-frames 74 carry a cutter 77 quite comparable to the cutter 72. In this instance, forward motion of the tube 49 when the cutter 77 is in engagement with the ground causes the cutter to rock out of engagement therewith as the device advances.

Means are particularly provided for withdrawing from the ground a strawberry which has been surrounded and isolated by the cutter 72. Preferably, a vacuum or subatmospheric pressure is utilized for that purpose. Conveniently mounted on the main frame 11 is a blower fan 81 of any standard kind having a drive 82 connected to the source of motor power on the tractor 12 and arranged with the blower outlet open to the atmosphere and with the blower inlet connected to an interior, telescopic air tube 83. Longitudinally movable with respect to the tube 83 is an exterior suction tube 84 forming part of the subframe 21 and connected through a U-bend 86 with an upper enclosure 87. This is included as part of the subframe 21 and continues in closed condition to merge with the various walls 43 and 44 defining the enclosed compartment 42.

With this arrangement, the diagonal movement of the subframe with respect to the main frame can readily be accommodated by the slip joint 88 formed between the ducts 83 and 84. The blower maintains a subatmospheric pressure not only within the ducts themselves and the U-bend 86, but likewise within the housing 87 and within the compartment 42. The capacity of the fan 81 is such that even though more than one of the tubes 49 is away from its uppermost position and thus admits atmospheric air to flow in through the opening 66, there is still maintained a subatmospheric pressure within the enclosure and there is still maintained a draft of atmospheric air through the mechanism.

At the time the tube 49 is in its uppermost position, it has a uniform atmospheric pressure throughout and does not have any air draft therethrough. The tube is actually isolated from the lower pressure within the compartment 42. However, when the tube 49 lowers to make the cutter 72 effective, the upper end of the tube then communicates with the compartment 42, and the tube comes under a subatmospheric pressure. Atmospheric air flows in between the struts 71 or between the A-frames 74 just above and around the cutter and flows upwardly through the tube 49 into the compartment 42. This air inflow just above and around the isolated and surrounded strawberry 9 produced by the low pressure is effective to lift the strawberry and any adherent materials or attached materials vertically upwardly through the tube 49. The strawberry travels in an air cushioned path so that the strawberry and any attachments come close to the opening 66. They do not pass out of that opening, however, or tend to enter it because of the influx of atmospheric air coming in a contrary direction. The resultant air current moves the strawberry and any appurtenances to the right in FIGURE 4 well into the interior of the compartment 42.

Inside the compartment the velocity of the strawberry is greatly attenuated and the strawberry falls by gravity into and is gently received by a water bath 91 maintained above the walls 44 of the compartment 42 and thus constituting a reservoir. During the time the strawberry enters and travels through the compartment 42, and even after it has plunged into the reservoir 91, it is subjected to a washing treatment by jets 98 of water emerging from a manifold 99. A suitable water source on the main frame is connected to the manifold through a water pump mounted on the main frame and appropriately driven. The strawberry thus tends to become cleansed of any adhesive material such as earth or mud and also is gently guided by the sprays into the water bath 91 without colliding with any of the hard metal surroundings. Injury to the strawberry is thus virtually nonexistent since it is initially lifted from its growing position by an air stream out of contact with the tube walls and turns a corner into the compartment 42, also out of contact with any metal, being deflected by the incoming air stream emerging from the opening 66, and finally gently falls by gravity and as guided by the sprays into the reservoir or water bath.

Whatever heavy, previously adhering materials are separated from the strawberry in the reservoir compartment fall by gravity into the bottom thereof and are ejected by a screw auger 101 effectively driven from the source of power. The auger is capable of expressing the relatively solid or heavy materials such as mud upwardly through a discharge duct 102 for rearward discharge from the carriage. The level of water within the reservoir is appropriately maintained by a float 103 actuating a valve 104 controlling influx from a supply line 106 connected to the water tank (not shown) on the main frame. In this fashion, the strawberries are not only gently received, but are washed and any heavy, adherent, unwanted materials are carried away and settled downwardly for discharge, any water lost being made up so that the level in kept constant.

To discharge the strawberries and light materials such as leaves or stems from the compartment 42 and particularly from the water bath or reservoir therein, there is provided on the subframe a cleated conveyor 107 having transverse flights 108 thereon. Conveniently, the material of the conveyor can be reticulated or screened. The conveyor is trained around a lower transverse roller 109 beneath the water in the reservoir and at its upper end is carried around a roller 111 at the upper end of the subframe near the U-turn 86. The conveyor is driven with its upper flight ascending. This is effective to lift up the strawberries and any other comparable light material from the surface of the water and to carry the strawberries and such material upwardly through the housing 87.

Since there is also a draft of air travelling through the housing, the strawberries are very promptly dried of water from the water bath by evaporation. A brief immersion of the freshly picked berries in water is not deleterious, but if the water is permitted to stand on them for a protracted time, the color of the berries changes adversely. In this instance, the berries are promptly lifted from the water and are subjected to a drying air current so that by the time they reach the upper end of the conveyor 107 they are dry or virtually so.

As the upper run of the conveyor rounds the roller 111, the relatively dry, relatively light materials such as leaves continue on around the bend 86 in a counterclockwise direction, being carried by the air current into the inlet of the blower 81. From the outlet 113 of the blower they are discharged to the atmosphere as waste. The dried berries, being relatively heavy, do not follow the air current, but round the upper roller 111 in a clockwise direction and fall into a rotary air lock 116 disposed beneath the discharge point of the roller 111 and includes as part of the carriage. The air lock includes a four-compartment roller 117 appropriately driven so that no free flow of air into the interior of the housing 87 is permitted, but so that separate bodies of strawberries are periodically discharged through a depending outlet tube 118. An attendant on the platform 17 provides successive boxes or containers for the discharged strawberries at that point and sees to it that the main vehicle 12 is periodically unloaded.

Particularly pursuant to the invention, especial means are provided for selecting only those strawberries growing in the field which are to be separated and removed.

Preferably mounted on the arm 53 just below the pin 54 of each of the cylinders 58 is a photoelectric cell 121 connected by appropriate electrical circuitry 122 and 123 with a control mechanism 124 and a source of power 126. Since much of this mechanism is standard, it is described only generally. The photoelectric cell 121 can be of any of a number of presently available commercial types. The cell is preferably one which is especially responsive to the red color of a ripe berry available for picking. The cell is little or non-responsive to the green leaf color or the yellow or green color or unripe berries unavailable for picking. The field of view of the individual cell 121 is relatively restricted since there are a number of cells arranged adjacent each other on the machine. Furthermore, the field of view becomes more and more restricted as the tube 49 lowers and in fact shifts off of the location of the initially viewed strawberry. The descent of the tube 49 in moving the once-triggered cell actually serves as a cutoff since the cell is no longer in position to be affected by reflection from the selected strawberry.

When the cell initially responds to a red strawberry, it is effective through the circuitry 122 and 123 upon the control 124. This connects the interior of the cylinder 58 through appropriate ports 127 and 128 to an air supply 129 and to the atmosphere respectively. The control 124 preferably incorporates a standard single cycle mechanism so that once energized by appropriate reflection onto the photocell 121 the piston 57 is driven through a complete cycle, a half cycle downwardly and a half cycle return. The piston then stops in its uppermost position until a subsequent triggering operation is occasioned by reflection of a red berry onto the particular photocell 121.

With the transversely overlapping arrangement of the various tubes and their respective individual cells, all of the area of two rows is scanned. As the machine advances in the field, when strawberries appropriate for harvesting are spotted by the individual cells passing thereover, the piston is operated to lower the corresponding tube. The lowering of the tube or the single cycle mechanism, or both, not only then cuts off further response by the photocell, but also the lowered tube segregates the strawberry from its surroundings. The tube position causes the strawberry to be swept into the interior of the machine by an air current induced by subatmospheric pressure. The individual tubes move without regard to each other, but solely in response to the control exercised on each of them by the individual, associated photoelectric cell. The positioning and angularity of the individual cells is adjusted with respect to the speed of advance of the machine and the speed of response of the tubes 49 so that the ripe berries are usually and preferably segregated with the berries very close to the center of the cutter when the cutter is in engagement with the ground around the berry. The harvested berries are handled in the reservoir and are separated from debris and discharged from the machine, as is the debris, in the fashion described.

What is claimed is:

1. A strawberry harvester comprising a main frame, means for supporting said main frame for advancement along a row of strawberries, a subframe, means for connecting said subframe to said main frame advancement therewith and for rising and falling movement with respect thereto, a reservoir on said subframe, means for subjecting said reservoir to subatmospheric pressure, a tube, means for mounting said tube on said subframe for motion in a path toward and away from a strawberry in said row, means for establishing and interrupting communication between said tube and said reservoir, means for moving said tube in said path, a light-sensitive device on said subframe, and means controlled by said device for operating said tube moving means.

2. A strawberry harvester comprising a carriage adapted to be advanced along a row of strawberries, a reservoir on said carriage, a tube, means for mounting said tube on said carriage for movement in a path toward and away from a strawberry in said row, means on said carriage for moving said tube in said path, means for intermittently establishing communication between said tube and said reservoir, means responsive to the presence of a strawberry in said row for operating said tube moving means, and means for establishing a subatmospheric pressure in said reservoir.

3. A strawberry harvester comprising a carriage adapted to be advanced along a row of strawberries, a reservoir on said carriage, a tube on said carriage and at one end extending into the vicinity of a strawberry in said row, means for intermittently establishing communication between the other end of said tube and said reservoir, means for establishing a subatmospheric pressure in said reservoir, and means on said carriage responsive to the presence of a strawberry in said row beneath said one end of said tube for operating said communication establishing means.

4. A strawberry harvester comprising a carriage adapted to be advanced along a row of strawberries, a reservoir on said carriage and having an interior wall, means for establishing a subatmospheric pressure in said reservoir, a tube, means for mounting said tube on said carriage for movement in a path between one position in which one end of said tube is in the vicinity of a strawberry in said row and another position in which the other end of said tube is in closing abutment with said interior wall, and means on said carriage responsive to the presence of a strawberry in said row for moving said tube in said path and into said one position.

5. A strawberry harvester as in claim 4 in which means are provided for urging said tube toward said other position except when said responsive means is effective.

6. A strawberry harvester comprising a tube, means for advancing said tube in a horizontal direction over a strawberry, means for subjecting the interior of said tube to a subatmospheric pressure, and means responsive to the presence of a strawberry in the vicinity of said tube for moving said tube in a downward direction over said strawberry.

7. A strawberry harvester comprising a substantially vertical tube, means for advancing said tube in a horizontal direction over a strawberry, means responsive to the presence of a strawberry in the vicinity of said tube for moving said tube in a downward direction over said strawberry with the lower end of said tube surrounding said strawberry, and means for removing the surrounded strawberry from within said tube.

8. A strawberry harvester comprising a substantially vertical tube, a cutter disposed at the lower end of said tube, means for advancing said tube in a horizontal direction over a strawberry, means responsive to the presence of a strawberry in a position substantially under said tube for moving said tube and said cutter in a downward direction to surround said strawberry and to isolate said strawberry from its surroundings, and means for moving said surrounded strawberry through said tube.

9. A strawberry harvester comprising a carriage movable over a row of strawberry plants growing in the field, means on said carriage for responding to the presence of a strawberry in said row, means on said carriage for severing said strawberry from a strawberry plant in response to said responding means, means on said carriage for removing said severed strawberry from said row by subatmospheric pressure, and means on said carriage for receiving said severed strawberry from said removing means.

10. A strawberry harvester comprising a carriage, a plurality of vertical tubes arranged on said carriage for advancement along a row of strawberries with said tubes in transversely overlapping relationship, means for individually moving each of said tubes in a vertical path toward and away from the ground, means individual to each of said tubes for responding to the presence of a strawberry in the individual path of advance of each of said tubes for operating said moving means for the respective one of said tubes to move said tube to surround said strawberry, and means on said carriage for removing said strawberry from said one of said tubes.

11. A strawberry picker as in claim 10 in which said removing means operates by subatmospheric pressure.

12. A strawberry picker as in claim 10 in which said responsive means is a photoelectric cell.

13. A strawberry picker as in claim 10 in which each of said tubes is provided on its lower end with a cutter.

14. A strawberry picker comprising a carriage adapted to be advanced over a row of strawberry plants in a field, a tube vertically arranged on said carriage in a position to overlie a strawberry on one of said plants, a cutter on the lower end of said tube, means on said carriage responsive to the presence of said strawberry, means controlled by said responsive means for lowering said tube to position said cutter to cut said strawberry from its surroundings, means for raising said tube to an uppermost position, means effective while said tube is out of said uppermost position for subjecting the interior of said tube to a subatmospheric pressure, a reservoir for receiving a strawberry from the upper end of said tube, and means on said frame for removing a strawberry from said reservoir.

References Cited

UNITED STATES PATENTS

| | | | |
|---|---|---|---|
| 2,088,676 | 8/1937 | White | 56—14 |
| 2,140,399 | 12/1938 | Connolly | 56—28 |
| 2,690,043 | 9/1954 | Marihart | 56—327 |
| 3,200,575 | 8/1965 | Hurst | 56—328 |

ANTONIO F. GUIDA, *Primary Examiner.*

RUSSELL R. KINSEY, *Examiner.*